United States Patent Office 3,652,556
Patented Mar. 28, 1972

3,652,556
AMINODIPHENYL-INDOLYL-METHANE
DYESTUFFS
Hans-Peter Kühlthau and Roderich Raue, Leverkusen,
Germany, assignors to Farbenfabriken Bayer Aktiengesellschaft, Leverkusen, Germany
No Drawing. Filed Mar. 29, 1968, Ser. No. 717,393
Claims priority, application Germany, Apr. 10, 1967,
F 52,081
Int. Cl. C07d 29/26, 51/70, 87/38
U.S. Cl. 260—242
4 Claims

ABSTRACT OF THE DISCLOSURE

Dyestuffs of the general formula

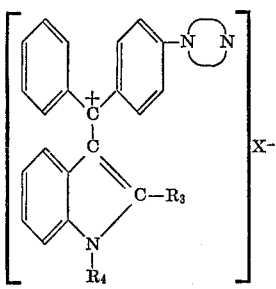

are prepared which are adapted for use in dyeing and printing materials made of leather, tannin treated cotton, cellulose acetate, synthetic super polyamides and polyurethanes and for the dyeing of lignin-containing fibers as well as for use in preparing ink-type materials. As dyestuffs the materials are characterized by good fastness to light, wet processing, rubbing and sublimation, and they are generally characterized by good affinity to the subject fibers.

---

The present invention relates to novel aminodiphenyl-indolyl-methane dyestuffs of the general formula

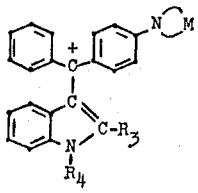

(I)

In this formula $R_3$ is hydrogen, an alkyl or aryl group, a carboxylic acid ester group, an optionally N-substituted carbonamide group or an alkoxy group, $R_4$ is hydrogen, an alkyl, aralkyl, cycloalkyl or aryl radical, M stands for the residual members of a 5- or 6-membered heterocyclic ring, and X is an anionic radical. The new dyestuffs may contain further substituents (non-ionic substituents) with the exception of sulphonic acid and carboxylic acid groups, in the aliphatic, cycloaliphatic, heterocyclic and aromatic radicals, including the benzene rings illustrated by the formulae.

Suitable non-ionic substituents are, for example: lower alkyl and alkoxy radicals with 1–4 carbon atoms; aralkyl such as benzyl; aralkoxy, such as benzyloxy; aryl, such as phenyl or phenyl radicals substituted by non-ionic radicals, e.g. chlorophenyl, methylphenyl, ethylphenyl, nitrophenyl, cyanophenyl etc; aryloxy groups, such as phenyloxy; halogen substituents, especially Cl and Br; carboxylic acid ester groups, especially carboxylic acid methyl ester and ethyl ester groups; optionally N-substituted carbonamide groups where the N-substituents are preferably lower alkyl groups which may be further substituted, e.g. by Cl, Br and OH; the cyano, nitro, hydroxyl and amino groups; alkylsulphonyl, such as methylsulphonyl and ethylsulphonyl; arylsulphonyl, such as benzene-sulphonyl and p-toluene-sulphonyl; acyloxy groups, such as acetoxy and propionyloxy; acylamino groups, such as acetylamino, propionylamino, ethylsulphonylamino, methylsulphonylamino, benzoylamino, benzene-sulphonylamino etc.; and acyl radicals, such as the benzoyl and acetyl radicals.

The new dyestuffs (I) are obtained by condensing benzophenones of the general formula

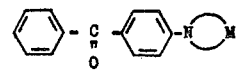

(II)

in which M has the same meaning as above, with indole derivatives of the general formula

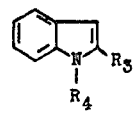

(III)

in which $R_3$ and $R_4$ have the same meaning as above, in the presence of acidic condensation agents to form dyestuffs of the Formula I, choosing starting components which are free from sulphonic acid and carboxylic acid groups.

The following benzophenones (II) are suitable starting materials for the production of the dyestuffs according to the invention, for example:

N-(4-benzoylphenyl)-morpholine,
N-(4-(2'-chlorobenzoyl)phenyl)-morpholine,
N-(4-(3'-chlorobenzoyl)-phenyl)-morpholine,
N-(4-(4'-chlorobenzoyl)-phenyl)-morpholine,
N-(4-(4'-methylbenzoyl)-phenyl)-morpholine,
N-(4-(4'-methoxybenzoyl)-phenyl)-morpholine,
N-(4-(2'-bromobenzoyl)-phenyl)-morpholine,
N-(4-(4'-cyanobenzoyl)-phenyl)-morpholine,
N-(4-benzoylphenyl)-piperidine,
N-(4-(2'-chlorobenzoyl)-phenyl)-piperidine,
N-(4-benzoylphenyl)-N'-methylpiperazine,
N-(4-benzoylphenyl)-N'-ethylpiperazine,
N-(4-benzoylphenyl)-N'-hydroxyethylpiperazine.

Suitable indole derivatives (III) are, for example:

2-methylindole,
2-phenylindole,
2,5-dimethylindole,
2-methyl-5-chloroindole,
2-phenyl-5-methylindole,
2-phenyl-5-chloroindole,
1,2-dimethylindole,
1-methyl-2-phenylindole,
1,2,5-trimethylindole,
1,5-dimethyl-2-phenylindole,
1,2-dimethyl-5-chloroindole,
1-methyl-2-phenyl-5-chloroindole,
1-ethyl-2-methylindole,
1-ethyl-2-phenylindole,
1-ethyl-2,5-dimethylindole,
1-ethyl-2-phenyl-5-methylindole,
1-ethyl-2-methyl-5-chloroindole,
1-ethyl-2-phenyl-5-chloroindole,
1-benzyl-2-methylindole,
1,4,7-trimethyl-2-phenylindole,
1-n-butyl-2-phenylindole,
1-isobutyl-2-(4'-chlorophenyl)-4,6-dimethylindole,
1-cyanoethyl-2-methylindole,
1-cyanoethyl-2-phenylindole.

Suitable acidic condensation agents are, for example: phosphorus oxychloride, thionyl chloride, phosgene, zinc chloride, aluminum chloride or tin chloride.

The reaction can be carried out in the presence or absence of an inert solvent. Suitable solvents are, for example, chlorobenzene, o-dichlorobenzene, toluene, xylene, benzene, ligroin, dioxan, cyclohexane, carbon tetrachloride, chloroform.

The reaction is generally carried out at an elevated temperature, for example, at 40–160° C., preferably at 70–120° C.

The anionic radicals $X^-$ can be inorganic as well as organic ions; examples are: $Cl^-$, $Br^-$, $I^-$, $CH_3SO_4^-$, $C_2H_5SO_4^-$, p-toluene sulphonate$^-$, $HSO_4^-$, benzene sulphonate$^-$, p-chlorobenzene sulphonate$^-$, phosphate$^-$, acetate$^-$, formate$^-$, propionate$^-$, oxalate$^-$, lactate$^-$, maleinate$^-$, crotonate$^-$, tartrate$^-$, citrate$^-$, $NO_3^-$, perchlorate$^-$, $ZnCl_3^-$. The type of the anionic radicals is of no importance for the properties of the dyestuffs, provided they are substantially colourless radicals which do not impair the solubility of the dyestuffs in an undesirable manner.

According to a further process, the dyestuffs (I) can also be obtained by condensing benzoylindoles of the general formula

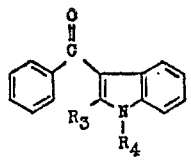

(IV)

with heterocyclic compounds of the general formula

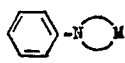

(V)

in which $R_3$, $R_4$ and M have the same meaning as above, in the presence of acidic condensation agents.

Benzoylindoles of the general Formula IV which are suitable for the preparation of the dyestuffs according to the invention are, for example:

1-methyl-2-phenyl-3-benzoylindole,
1,2-dimethyl-3-benzoylindole,
1,2,5-trimethyl-3-benzoylindole,
1,5-dimethyl-2-phenyl-3-benzoylindole,
1,2-dimethyl-3-benzoyl-5-chloroindole,
1-methyl-2-phenyl-3-benzoyl-5-chloroindole,
1-ethyl-2-methyl-3-benzoylindole,
1-ethyl-2-phenyl-3-benzoylindole,
1-benzyl-2-methyl-3-benzoylindole,
1,4,7-trimethyl-2-phenyl-3-benzoylindole,
1-n-butyl-2-phenyl-3-benzoylindole,
1-cyanoethyl-2-methyl-3-benzoylindole,
1-cyanoethyl-2-phenyl-3-benzoylindole,
1-methyl-2-(2'-chlorophenyl)-3-benzoylindole,
1-methyl-2-phenyl-3-(2'-chlorobenzoyl)-indole,
1-methyl-2-phenyl-3-(3'-chlorobenzoyl)-indole,
1-methyl-2-phenyl-3-(4'-methylbenzoyl)-indole,
1,2-dimethyl-3-(2'-chlorobenzoyl)-indole,
1,2-dimethyl-3-(3'-chlorobenzoyl)-indole,
1,2-dimethyl-3-(3'-chlorobenzoyl)-indole,
1,2-dimethyl-3-(4'-methylbenzoyl)-indole and
1-ethyl-2-phenyl-3-(2'-chlorobenzoyl)-indole.

Suitable heterocyclic compounds of the general formula V are, for example:

N-phenylmorpholine,
N-(3-methylphenyl)-morpholine,
N-(3-chlorophenyl)-morpholine,
N-phenylpiperidine,
N-phenylthiomorpholine,
N-phenyl-N'-methylpiperazine,
N-phenyl-N'-ethylpiperazine,
N-phenyl-N'-ethylpiperazine,
N-phenyl-N'-hydroxyethylpiperazine and
N-phenylpyrrolidine.

Another suitable process for the preparation of the new dyestuffs consists in that benzanilides of the formula

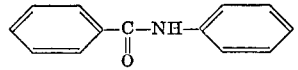

(VI)

are condensed with heterocyclic compounds of the general Formula V in the presence of acidic condensation agents, and the intermediate product is subsequently condensed, without being isolated, with indoles of the general Formula III.

Examples of benzanilides (VI) which are suitable for this process are:

benzanilide,
2-chlorobenzanilide,
3-chlorobenzanilide,
4-chlorobenzanilide,
2-methylbenzanilide,
3-methylbenzanilide,
4-methylbenzanilide,
2-methoxybenzanilide,
4-methoxybenzanilide,
2-ethoxybenzanilide,
2,4-dimethylbenzanilide,
2,5-dichlorobenzanilide,
2,6-dichlorobenzanilide, and
2,4-dimethoxybenzanilide.

As heterocyclic compounds (V), the components which were mentioned for the second method of operation are again suitable. As indole compounds, there may be used those mentioned as suitable for the first method of operation. As acidic condensation agents, phosphorus oxychloride, thionyl chloride, phosgene, zinc chloride, aluminium chloride and others are again suitable.

Another, particularly suitable process for the production of the dyestuffs of the Formula I consists in condensing compounds of the general formula

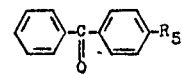

(VII)

in which $R_5$ stands for a halogen atom, the hydroxy group, an alkoxy, acyloxy, amino or sulphonic acid group, with indole derivatives of the Formula III in the presence of acidic condensation agents, and reacting the intermediates so obtained, of the formula

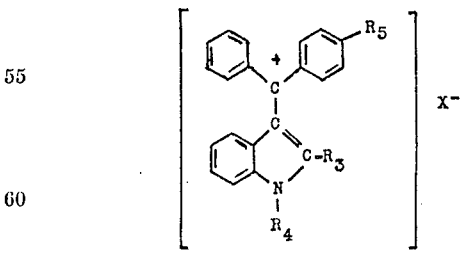

(VIII)

in which $R_3$, $R_4$, $R_5$ and X have the same meaning as above, with heterocyclic compounds of the general formula

with the exchange of the radical $R_5$ for the radical of the heterocyclic compound (IX).

Suitable benzophenones of the Formula VII are, for example:

4-chlorobenzophenone,
4-chloro-4'-methylbenzophenone, 4-chloro-4'-ethylbenzophenone,
4-methoxybenzophenone,
2,4-dimethoxybenzophenone,
4-hydroxybenzophenone,
2-chloro-4'-methoxybenzophenone,
2,4'-dichlorobenzophenone,
4-methoxy-4'-methylbenzophenone.

Suitable heterocyclic compounds of the Formula IX are, for example:

Morpholine, thiomorpholine, N-methylpiperazine, N-ethylpiperazine, N-hydroxyethyl-piperazine, pyrrolidine.

The intermediates of the Formula VIII are expediently heated in an excess of the heterocyclic compounds (IX) with the addition of a lower aliphatic carboxylic acid and/or an acidic condensation agent to temperatures of 80–130° C., and the dyestuff (I) is isolated by precipitation into an aqueous acid.

The products which can be obtained according to the invention are extremely valuable dyestuffs which can be used for the dyeing and printing of materials made of leather, tannin-treated cotton, cellulose acetate, synthetic superpolyamides and -polyurethanes, and for the dyeing of lignin-containing fibres such as coco, jute and sisal. They are also suitable for the production of writing liquors, stamping inks, pastes for ball point pens, and they can be used in offset printing. Above all, they are well suited for the dyeing and printing of materials consisting, wholly or in part, of polymerised acrylonitrile and/or vinylidene cyanide and are here characterised by very good fastness to light, wet processing, rubbing and sublimation. They also have a very good affinity to these fibres and a good fastness to cross-dyeing. With anionic precipitation agents, such as alumina, tannin, phosphotungstic (molybdic) acids, the dyestuffs form pigments which are fast to light and can be used with advantage in paper printing.

Furthermore, the new dyestuffs are very well suited for the dyeing and printing of acid-modified polyester fibres, such as polyethylene glycol terephthalates containing sulphonic acid groups (type Dacron 64, manufacturers E. I. du Pont de Nemours and Company).

EXAMPLE 1

10 parts by weight N-(4-benzoylphenyl)-morpholine are heated with 7.7 parts by weight 1-methyl-2-phenyl-indole and 15 parts by weight phosphorus oxychloride at 100° C. for 4 hours. The hot melt is poured into 500 parts by volume of water. After stirring for 3 hours, the product is salted out with 130 parts by weight sodium chloride, the solution is separated from the dyestuff and the latter is redissolved in 1000 parts by volume of boiling water with the addition of active charcoal. The dyestuff is precipitated by the addition of 50 parts by weight sodium chloride and 10 parts by weight zinc chloride, filtered off with suction, and dried in a vacuum at 50° C. The dyestuff dyes polyacrylonitrile materials in very fast bluish green shades.

The N-(4-benzoylphenyl)-morpholine was prepared in the following manner:

100 parts by weight benzanilide, 278 parts by weight N-phenyl-morpholine and 105 parts by weight phosphorus oxychloride are stirred at 100° C. for 4 hours. The hot melt is then poured into a solution at 50° C., of 65 parts by weight of 37% hydrochloric acid in 440 parts by volume of water, the mixture is stirred for 2 hours and then diluted with 5000 parts by volume of water. The crystallised N-(4-benzoylphenyl)-morpholine is further stirred for several hours, filtered off with suction and washed with water until neutral. It is dried in a vacuum at 50° C.

When the reaction is carried out according to the process described above with the N-benzoylphenyl-morpholines and indole derivatives stated in the following table, then dyestuffs are also obtained, which are characterised by very good dyeing properties.

| N-benzoylphenyl-morpholine | Indole | Shade on polyacrylonitrile fibres |
|---|---|---|
| N-(4-benzoylphenyl)-morpholine. | 1,2-dimethylindole | Reddish blue. |
| Do | 1-ethyl-2-phenylindole | Blue-green. |
| N-(4-(2-chlorobenzoyl)-phenyl)-morpholine. | 1-methyl-2-phenylindole | Strongly greenish blue. |
| Do | 1,2-dimethylindole | Reddish blue. |
| N-(4-(4'-methoxybenzoyl)-phenyl)-morpholine. | 1-methyl-2-phenylindole | Grey. |
| Do | 1,2-dimethylindole | Currant. |

EXAMPLE 2

216 parts by weight 4-chlorobenzophenone and 207 parts by weight 1-methyl-2-phenylindole are dissolved at 70° C. in 1800 parts by volume chlorobenzene, and 160 parts by weight of anhydrous zinc chloride are added. 306 parts by weight phosphorus oxychloride are subsequently added to the mixture which is stirred at 120–125° C. for 18 hours. The compound which separates in crystalline form upon colling is stirred for some time, filtered off with suction, washed with cold chlorobenzene and dried.

13.5 parts by weight of the compound so obtained, 20 parts by volume of glacial acetic acid, 5 parts by weight zinc chloride and 20 parts by volume morpholine are heated at 80° C. for 20 hours while stirring. The hot melt is then introduced into 500 parts by volume of 5% hydrochloric acid, and the dyestuff is separated from the solution after stirring for one hour. The dyestuff is further purified by dissolving it in 700 parts by volume of boiling water, clarifying the solution with active charcoal and precipitating the dyestuff with 100 parts by weight sodium chloride. The dyestuff dyes fibres of polyacrylonitrile in a deep bluish green shade of very good fastness properties. The dyestuff is identical with the product described in Example 1 and corresponds to the formula

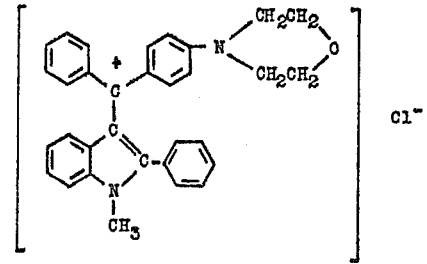

When the morpholine is replaced in the example described above by other cyclic amines and the process is otherwise carried out in the same way, then dyestuffs are obtained which also dye polyacrylonitrile fibres in very fast shades.

Cyclic amine: Shade on polyacrylonitrile
   Piperidine _____ Strongly greenish blue.
   N-hydroxyethylpiperazine __ Do.
   2,5-dimethylpiperazine _____ Do.

EXAMPLE 3

Polyacrylonitrile fibres are introduced at 40° C. in a liquor ratio of 1:40 into an aqueous bath containing, per litre, 0.75 g. of 30% acetic acid, 0.38 g. sodium acetate and 0.3 g. of the morpholyl-diphenyl-indolyl-methane dyestuff described in Example 1 and illustrated by the formula. The bath is heated to boiling temperature within 20–30 minutes and kept at this temperature for 30–60 minutes. The polyacrylonitrile fibres are subsequently rinsed and dried. A bluish green dyeing of very good fastness properties is obtained.

EXAMPLE 4

From 2 parts by weight of the morpholyl-diphenyl-indolyl-methane dyestuff the preparation of which is described in Example 1, 60 parts by weight glycerol, 20 parts by weight of water and 20 parts by weight of spirits, there is prepared a stamping ink which yields strong green prints.

EXAMPLE 5

East-Indian bastard leather which has been prepared for dyeing in the usual manner, is dyed at 40° C. for 45 minutes in the drum in a liquor ratio of 1:10 with 1% of the dyestuff described in Example 2, which has previously been pasted with the same amount of 30% acetic acid. The leather is finished in known manner. A greenish blue dyeing of good fastness properties is obtained.

EXAMPLE 6

Acid-modified polyglycol terephthalate fibres of the type Dacron 64 (Du Pont) or as are described in Belgian patent specification No. 549,179 and in U.S. patent specification No. 2,893,816 are introduced at 20° C. in a liquor ratio of 1:40 into an aqueous bath which contains, per litre, 3 g. sodium sulphate, 0.5 to 1 g. of an oleyl polyglycol ether (50 moles ethylene oxide), 2.5 to 5 g. diphenyl and 0.3 g. of the dyestuff corresponding to the formula of Example 2, and which has been adjusted with acetic acid to a pH value of 4.5 to 5.5. The bath is heated to 95° C. within 30 minutes and kept at this temperature for 60 minutes. The fibres are subsequently rinsed and dried. A bluish green dyeing of very good fastness properties is obtained.

EXAMPLE 7

Acid-modified polyglycol terephthalate fibres, as in Example 6, are introduced at 20° C. in a liquor ratio of 1:40 into an aqueous bath which contains, per litre, 6 to 10 g. sodium sulphate, 0.5 to 1 g. oleyl polyglycol ether (50 moles ethylene oxide), 0 to 15 g. dimethylbenzyl-dodecyl ammonium chloride and 0.3 g. of the dyestuff corresponding to the formula of Example 2, and which has been adjusted with acetic acid to pH 4 to 5. The bath is heated to 120° C. within 30 minutes and kept at this temperature for 60 minutes. The fibres are subsequently rinsed and dried. A bluish green dyeing of very good fastness properties is obtained.

EXAMPLE 8

15 parts by weight of 1-(p'-benzoylphenyl)-3-methyl-pyrazoline, 11.7 parts by weight of 1-methyl-2-phenyl-indole and 25 parts by weight of phosphorus oxychloride are stirred at 100° C. for 8 hours. The hot melt is poured into 1 litre of water. It is stirred over night and thereafter the dyestuff separated from the solution. The dyestuff is redissolved from 100 parts by volume of boiling water and salted out with 50 parts by weight of sodium chloride. It is dried in a vacuum at 50° C. The dyestuff obtained corresponds to the formula

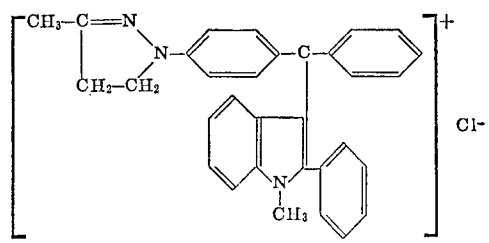

and dyes polyacrylonitrile material very fast bluish green.

Similar valuable dyestuffs are obtained when the 1-benzoylphenyl-pyrazolines and indoles of the following table are reacted as described above:

| Benzoylpyrazoline | Indole | Shade on polyacrylonitrile |
|---|---|---|
| 1-(p'-benzoylphenyl)-3-methyl-pyrazoline. | 1,2-dimethylindole | Greenish blue. |
| 1-(p'-benzoylphenyl)-3-phenyl-pyrazoline. | 1-methyl-2-phenyl-indole. | Bluish green. |
| Do | 1,2-dimethylindole | Do. |
| 1-[p'-(2'-chlorobenzoyl)-phenyl]-3-phenyl-pyrazoline. | do | Blue-green. |
| Do | 1-methyl-2-phenyl-indole. | Bluish green. |
| 1-[p'-(2'-chlorobenzoyl)-phenyl]-3-methyl-pyrazoline. | 1,2-dimethylindole | Greenish blue. |
| Do | 1-methyl-2-phenyl-indole. | Blue-green. |
| 1-[p'-(4'-methoxybenzoyl)-phenyl]3-methyl-pyrazoline. | do | Do. |
| Do | 1,2-dimethylindole | Bluish green. |
| 1-[p'-(4'-methoxybenzoyl)-phenyl]3-phenyl-pyrazoline. | 1-methyl-2-phenyl-indole. | Grey-green. |
| Do | 1,2-dimethylindole | Bluish green. |

What is claimed is:
1. A dyestuff of the formula

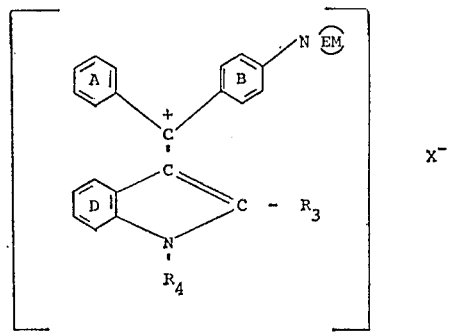

wherein
the rings A and B are unsubstituted or monosubstituted by a non-ionic substituent selected from the group consisting of chloro, bromo, methyl, methoxy, cyano, ethyl, hydroxyethyl, ethoxy and phenyl,
the ring is unsubstituted, and the ring D is unsubstituted or substituted by 1–2 substituents selected from the class consisting of chloro, bromo, methyl, methoxy, cyano, ethyl, hydroxyethyl, ethoxy and phenyl,
and M stands for —$CH_2$—$CH_2$—O—$CH_2$—$CH_2$—,
—$CH_2$—$CH_2$—$CH_2$—$CH_2$—$CH_2$—,
—$CH_2$—$CH_2$—NH—$CH_2$—$CH_2$—,
—$CH_2$—$CH_2$N($CH_3$)—$CH_2$—$CH_2$—,
—$CH_2$—$CH_2$—N($CH_2H_5$)—$CH_2$—$CH_2$—, or
$CH_2$—$CH_2$—N($C_2H_4OH$)—$CH_2$—$CH_2$—;
wherein
$R_3$ stands for hydrogen, lower alkyl, phenyl or chlorophenyl;
$R_4$ stands for hydrogen, lower alkyl, cyano ethyl, or benzyl; and
X is a substantially colorless anion which does not undesirably impair use of a dyestuff.
2. A dyestuff of claim 1 of the formula

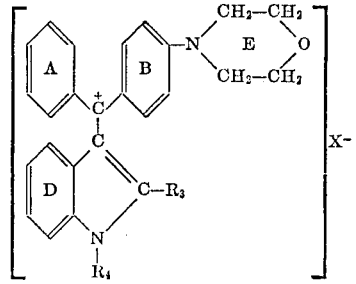

3. The dyestuff of claim 1 of the formula

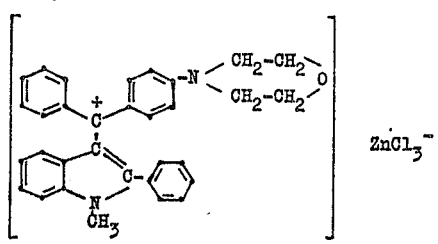

4. The dyestuff of claim 1 of the formula

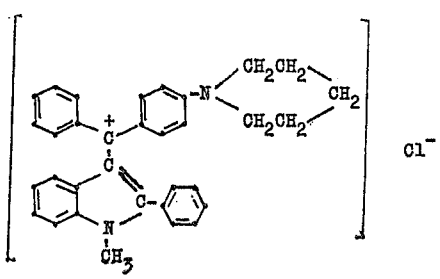

References Cited

FOREIGN PATENTS 1,232,560  10/1960  France _____ 260—326.15

OTHER REFERENCES

Chem. Abst. I, vol. 70, abstract 88823z (1969). QD1.A51.

Chem. Abst. II, Formula Index, vol. 70, p. 1199F (January–June 1969, 1970), QD1.A51.

Colour Index, 2nd ed., vol. 3, pp. 3346–8, 3379, and 3380, Lowell, Mass., Amer. Assoc. Tex. Chem. Col. (1956), TP910.S6.

Netherlands application 6710576, February 1968 (1 page drawing, 24 page spec.), 260–326.15.

NATALIE TROUSOF, Primary Examiner

U.S. Cl. X.R.

8—54.2, 62, 63, 94.1, 117 AB, 177 R, 178 E, 178 R, 179; 260—247.5 B, 247.7 K, 268 BC, 268 PH, 270 R, 293.61, 299, 310 D, 319.1, 326.12 R, 326.13 R, 326.15, 326.16

UNITED STATES PATENT OFFICE
CERTIFICATE OF CORRECTION

Patent No. 3,652,556        Dated March 28, 1972

Inventor(s) Hans-Peter Kuhlthau and Roderich Raue

It is certified that error appears in the above-identified patent and that said Letters Patent are hereby corrected as shown below:

| Column | Line | Error |
|---|---|---|
| 3 | 62 & 63 | Both are repetitious. |
| 3 & 4 | 75 & 1 | Both are repetitious. |
| 8 | 44 | "the ring is" should be ---the ring E is---. |

Signed and sealed this 27th day of August 1974.

(SEAL)
Attest:

McCOY M. GIBSON, JR.
Attesting Officer

C. MARSHALL DANN
Commissioner of Patents